Feb. 22, 1966        F. S. DOWELL        3,236,335

SELF-ENERGIZING, SPOT TYPE DISC BRAKE

Filed July 8, 1963        2 Sheets-Sheet 1

Inventor:
Frederick Sidney Dowell
by Benj. T. Rauber
attorney

Patented Feb. 22, 1966

3,236,335
SELF-ENERGIZING, SPOT TYPE DISC BRAKE
Frederick Sidney Dowell, Coventry, England, assignor to Dunlop Rubber Company Limited, London, England, a British company
Filed July 8, 1963, Ser. No. 293,379
Claims priority, application Great Britain, July 10, 1962, 26,387/62
17 Claims. (Cl. 188—73)

My present invention relates to disc brakes and particularly to disc brakes for vehicles.

Disc brakes comprise a disc rotated by the element to be braked as, for example, the brakes of a vehicle and at least one friction pad on each side of the disc movable relatively to the disc into frictional engagement under pressure with the opposite sides of the disc.

Heretofore friction pads were guided in a direction toward or from the disc by guiding means on opposite sides of the friction element which receives the force imparted to the friction element by the frictional drag of the friction element on the disc. These guides were fixed to a non-rotating part of the vehicle or other apparatus. The friction elements were moved toward and from the disc by a force applying means as, for example, a moving element of a cylinder and piston combination. The friction guides have heretofore comprised an abutment surface to receive and support the force imparted to the friction element in a forward rotation, and an abutment surface on the opposite side of the friction element to receive the force of the friction element when the disc is rotated in reverse direction.

The abutment surfaces of some brakes were at a right angle to, or normal to, the sides of the disc. Or when a servo friction is required they were inclined at an angle to the surface of the disc in the direction of rotation.

The guiding or abutment surfaces for sustaining the force imposed by the drag of the rotating disc in either direction comprised either a cylindrical extension of a cylinder of a cylinder and piston means, or they were separate elements one on each side of the friction element having spaced abutment surfaces to receive and guide the friction element. In the disc brakes heretofore known, in order to avoid looseness and to provide a firm support for the friction element in both directions it was necessary to machine the abutment surfaces with precision, which involved considerable expense, particularly when the abutment surfaces were inclined for the purpose of obtaining a servo action. Also it was necessary that the abutment surfaces fit the abutment surfaces on opposite sides of the friction element with a close tolerance. Wear of the friction elements reduced the precision required for optimum performance.

In my present invention I obviate these difficulties and requirements by providing an abutment surface only on the trailing side of the friction elements, that is, the side which supports the friction element during forward rotation of the disc, the friction element being held at all times against this trailing surface by having the force applying means arranged in a manner specified hereinafter to keep the friction element pressed against this abutment surface both in forward and reverse rotation of the disc.

To this end the direction of application of force by the brake applying means, such as a cylinder and piston, is inclined to a line normal to the surface of the disc, and in a plane parallel to the tangential direction of rotation of the disc adjacent the friction element at an angle whose tangent is at least equal to the highest possible value of the coefficient of friction between the friction element and the disc. The coefficient of kinetic (sliding) friction for two surfaces is the ratio of the tangential force which is required to sustain motion without acceleration of one surface with respect to the other, to the normal force which presses the two surfaces together. The coefficient of static friction is the ratio of the maximum tangential force which is required initially to produce motion of one surface with respect to the other, to the normal force which presses the two surfaces together. It is generally greater than the coefficient of kinetic friction.

I have discovered that if the direction of the brake applying force in a plane in, or parallel to, a tangent to the disc, is at an angle, $\theta$, to a line normal to the disc and the tangent of the angle $\theta$ is equal to the coefficient of friction between the friction element and the disc, it will have a component of force parallel to the disc sufficient to hold the friction element from movement away from the abutment surface at the trailing edge on reverse rotation of the disc. In effect, the brake applying means serves not only to force the friction pad against the disc but also functions as an abutment for the leading edge of the friction element. The force applying means, therefore, replaces the leading abutment heretofore serving to support the drag of the disc on the friction element in reverse rotation of the disc.

The force applying means is used to hold the friction elements in reverse rotation of the disc because the speeds in reverse are generally very much lower than the forward speeds and less braking force is required. The angle $\theta$ may have a tangent somewhat higher than that corresponding to the coefficient of friction, inasmuch as this would be somewhat greater than is necessary to merely hold the friction elements against the drag of the disc in reverse rotation and would press it by such excess amount against the trailing abutment surface and provide a slight servo action.

While the invention is of particular advantage for trailing abutment surfaces inclined to give a servo action, it may also serve as a leading abutment surface when the trailing abutment surface is normal to the disc or inclined at a very small angle.

The direction of force application is determined, as pointed out above, by the coefficient of friction and the angle of trailing abutment is determined by the servo action desired and, accordingly, these angles of inclination are determined independently. However, there is a relation between these angles inasmuch as the servo action is determined by the angle of the trailing abutment together with the force with which the friction element is pressed against the trailing abutment surface by the drag of the disc. The total force of the friction element against the trailing abutment surface is the sum of the force due to the drag of the disc and the component parallel to the disc of the brake applying force.

The component of the force parallel to the surface of the disc obtained by the above inclination of the direction of force being added to the force obtained by the drag of the disc enables a given servo action to be obtained with an abutment angle to the normal smaller than would otherwise be required. This is of advantage as release of the braking force releases a part of the wedging force on which the servo action depends and, together with the lesser angle of trailing abutment surface to normal, reduces any tendency for the wedging action to continue after the braking force is withdrawn.

In the brake of my invention the force applying means as, for example, the piston of a cylinder and piston combination, must have a sliding engagement with the friction element so that the friction element will be free to move transversely of the line of force and thus avoid the imposition of any stresses on the piston other than in the direction of the line of force.

The direction of thrust of the brake-applying means may be arranged to be in the required direction by suitably inclining the axis of the thrust device, e.g. a piston and cylinder. Alternately, a thrust device having an axis perpendicular to the disc, or in any other direction, can be used, the thrust being converted to the required direction by known means such as an arrangement of cams, levers or the like mechanisms.

The abutment face provided is normally the trailing abutment face and inclined obliquely to the disc to provide a servo effect in the direction of forward rotation of the disc. When the disc is rotated in the reverse direction it might be thought that if no leading abutment face were provided a negative servo effect would be obtained, the friction element being moved away from the abutment face by the drag of the disc, but I have discovered that by suitably arranging the line of action of the brake operating mechanism it is possible to ensure that the friction element is held against the trailing abutment face during reverse rotation of the disc as well as during forward rotation. This effect results from the fact that if the direction of thrust of the operating mechanism is inclined at a sufficiently large angle to a line perpendicular to the disc, the resolved part of its thrust on the friction element in a direction parallel to the disc is larger than the frictional drag exerted on the element by the reverse rotation of the disc.

In a preferred construction the brake operating mechanism for each friction element consists of a cylinder and piston. The angle between the axis of the cylinder and a line perpendicular to the disc will be referred to as the "cylinder angle."

Preferably the disc brake according to the invention is arranged as a servo brake, the abutment face being inclined obliquely relative to the plane of the disc.

One embodiment of the invention will now be described with reference to the accompanying drawings, in which.

Figure 2:
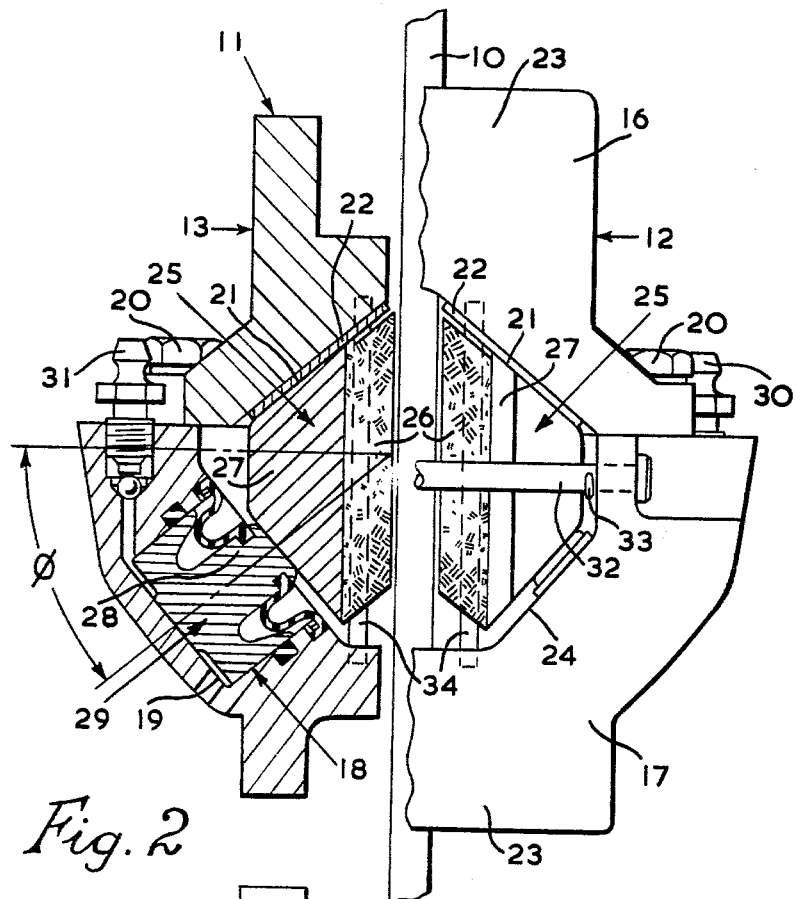
FIGURE 2 is a plan view corresponding to FIGURE 1, the brake being shown in cross-section as indicated by the line II—II in FIGURE 1.
Figure 1:
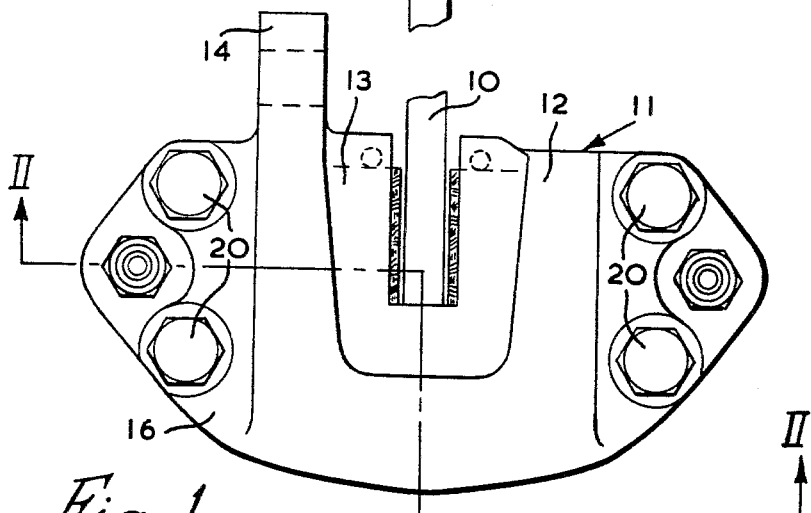
FIGURE 1 is an end elevation of a servo disc brake, only part of the disc being shown.
Figure 3:
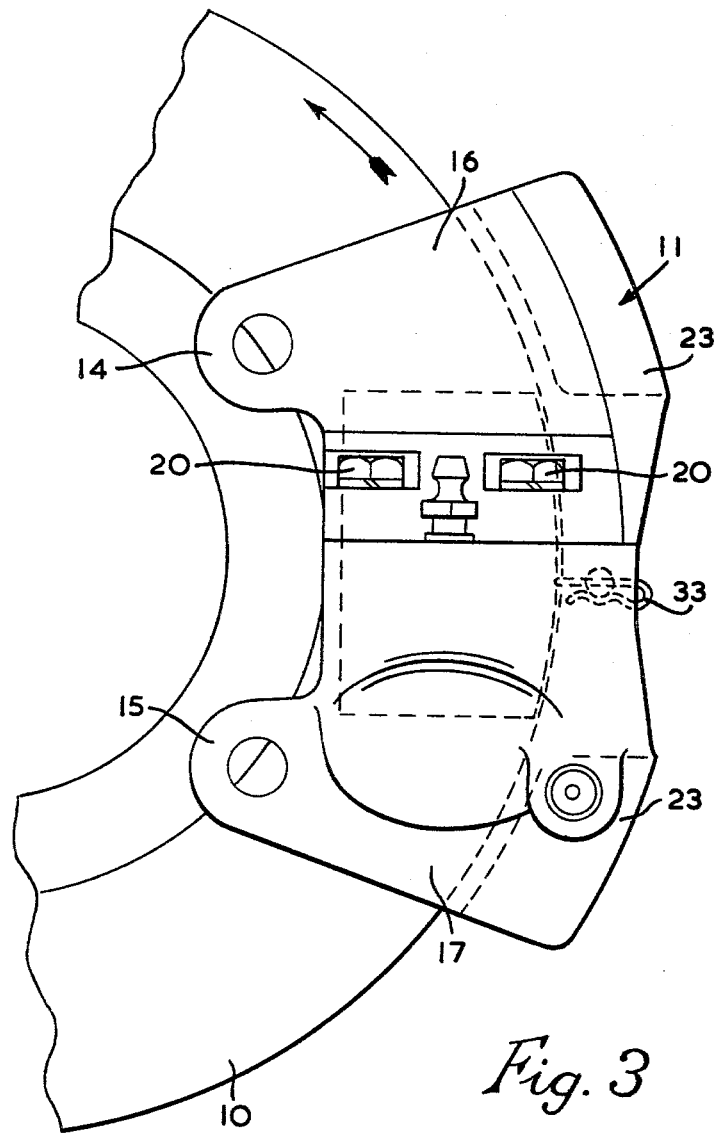
FIGURE 3 is a side elevation, viewed in the axial direction of the disc, of the brake shown in FIGURES 1 and 2.

The brake shown in FIGURES 1–3 comprises a rotatable, axially-fixed disc 10 and a non-rotatable, axially-fixed caliper type housing 11 having limbs 12 and 13 which straddle the outer periphery of the disc and cover a minor portion of the braking surfaces thereof. Lugs 14 and 15 are provided on the housing to enable it to be secured to a non-rotatable part of a vehicle.

The housing 11 is split between its circumferential extremities in a plane extending transversely of the disc into two parts 16 and 17 which are detachably bolted together. The part 17 is provided with the brake-applying mechanisms 18. The mechanisms 18 comprise a pair of cylinders 19, only one of which is shown, machined in the limbs 12 and 13 of the housing 11, one on each side of the disc. The cylinders 19 are inclined obliquely to the surfaces of the disc in a plane containing a chord of the disc and perpendicular thereto, and the angle of inclination is such that the axis of each cylinder makes with a perpendicular of the disc an angle $\phi$ which is not less than a critical value $\theta$ which is represented by the formula $\theta = \tan^{-1}\mu$, where $\mu$ equals the highest possible value of the pad-to-disc coefficient of friction.

The other part 16 of the housing 11 is detachably bolted to the part 17 by pairs of bolts 20, one pair on each side of the disc. The part 16, which is on the trailing end of the housing for normal rotation of the disc, i.e. for forward movement of the vehicle, has a pair of surfaces 21, one on each side of the disc, which form abutment faces for the pads. These abutment faces must be inclined if any servo effect is to be obtained and preferably the angle of inclination is equal to the cylinder angle $\phi$. As shown in FIGURE 2 these inclined faces are formed on bearing strips 22 fastened to the housing, the strips 22 having low-friction and anti-corrosion properties, of the kind described in our co-pending British application No. 22,644/62.

The two housing parts 16 and 17 are provided at opposite ends of the housing with integral connecting members 23 which bridge the outer periphery of the disc, and an aperture 24 is formed between said members. The aperture 24 provides access to openings on each side of the disc which are substantially triangular in plan-view and which extend radially through the housing. A friction element in the form of a pad assembly 25, of substantially complementary shape to that of the opening, is located in each opening.

The assemblies 25 each comprise a friction pad 26 and a backing member 27, the backing member being substantially triangular in a cross-section taken transversely with a respect to the disc. A stem 28 extending axially from a piston 29 slidable in each cylinder 19 makes abutting engagement with the associated backing member 27, the stem 28 being slidable on the backing member, thus ensuring that the cylinder does not provide an abutment face on the leading side of the friction pad assembly. The cylinders 19 are both connected, through an inlet 30 and drilled passages in the housing (not shown) to a source of hydraulic pressure such as a master cylinder. A bleed valve 31 is provided for the hydraulic system.

Operation of the master cylinder forces the pad assemblies towards the disc so that, for forward rotation of the disc, the pads are wedged between the rotating disc and the trailing abutment face 21, giving a considerable servo effect. In the construction illustrated the friction pads 26 are relieved on their trailing edges so that only the backing members 27 contact their respective abutment faces. This reduces the friction between the pad assemblies and the abutment faces.

The pad assemblies are prevented from moving radially outwardly by a pin 32 passing through holes in the housing on each side of the disc and retained in position by a spring clip 33. The pad assemblies are supported on their radially inner sides by abutments in the form of pins 34 which are inserted during assembly of the housing into blind bores formed in each of the housing parts.

For reverse direction of rotation of the disc, the cylinder angle $\phi$, evolved from the formula given above, is such that the pads are forced into contact with the same abutment face. Thus a wedge action occurs on the pad for reverse rotation as well as for forward rotation. The effectiveness of the piston force is reduced due to its inclination, but because of the assistance of the wedge action an overall thrust multiplying factor is produced with a minimum value not substantially below unity, and which may be greater than unity depending on the selection of cylinder and abutment face angle.

There are other advantages to be gained by this construction. The abutment faces for the leading edges of the pads are dispensed with, which eliminates a machining operation and the need to provide anti-friction bearings and anti-corrosion protection, and this simplifies the brake design. There is moreover no necessity for close tolerances on the circumferential width of the pad assembly in the aperture and there is no danger of the pad seizing in the housing due to expansion, corrosion etc.

It is also an advantage to manufacture the housing in two parts with an aperture extending radially clear through the housing, since the pads may readily be inspected for wear and pad renewal is simplified.

It should be noted that the angle of the abutment surface need not be the same as the cylinder angle, i.e. the direction of the applied force. The abutment surface could be square to the disc surface, which would result in no servo effect, but substantially equal performance in both directions.

In a braking application with a fair proportion of reverse braking, the use of forward and rear abutments for the pad results in uneven wear and a convex surface between the leading and trailing edges. With a single abutment for forward and reverse braking, uniform wear takes place.

In the foregoing, the term "forward rotation" refers to the direction of disc rotation giving the larger servo effect. The brake can of course be installed on a vehicle if required, so that reverse motion on the vehicle generates the larger servo effect.

The invention is also applicable to a brake in which an inclined pad is provided on one side of the disc only.

Having now described my invention, what I claim is:

1. A disc brake comprising a rotatable disc, a pair of friction elements, one on each side of said disc in axially aligned positions, a force supporting abutment for at least one of said friction elements when said disc is rotating in one direction, a means for applying a braking force to said friction element in a direction inclined toward said abutment in a plane parallel to the tangential direction of rotation of the disc adjacent the friction element and at an angle to a normal to said disc whose tangent is at least equal to the coefficient of kinetic friction between said friction element and said disc, said force applying means having a connection to said friction element slidable transversely to said direction of applicatioin of force to enable said force applying means to serve as the sole abutment element for said friction element when said disc rotates in the opposite direction.

2. The brake of claim 1 in which said means for applying a braking force to said friction element comprises a piston and cylinder assembly having an abutting contact with said friction element.

3. The brake of claim 1 comprising a non-rotatable caliper straddling said disc and having on at least one side of said disc a radially extending passage opening radially outwardly and comprising said force supporting abutment, and a removable retainer for retaining said friction element within said passage.

4. The brake of claim 3 in which said passage comprises a first and a second side extending axially from an edge adjacent said disc to a ridge to form a passage of triangular cross-section and in which said first side forms said abutment and in which the direction of said braking force is normal to said second side and in which said friction element has surfaces opposed to and complementatry to said sides of said passage.

5. The disc brake of claim 1 wherein the abutment surface of said abutment face is inclined obliquely to the plane of the disc to provide a servo effect.

6. The disc brake of claim 1 wherein the friction element comprises a friction pad and a rigid backing member rigidly secured thereto.

7. The disc brake of claim 6 wherein the friction pad is relieved on its side adjacent said abutment so that only the backing member contacts said abutment.

8. The disc brake according to claim 1 wherein the backing member is substantially triangular in a cross-section taken transversely with respect to the disc.

9. The disc brake of claim 3 wherein the caliper is formed from at least two parts, the joint between the parts extending in an axial direction between the circumferential extremities of the caliper.

10. The disc brake of claim 9 wherein the abutment is located in one part of the caliper and the brake operating mechanism associated with each friction element is located in the other part of the caliper.

11. The disc brake of claim 3 comprising an abutment for preventing radially inward movement of the friction element, said abutment comprising a pin fastened at its ends to the caliper.

12. The disc brake of claim 11 wherein the ends of the pin are held in blind bores formed in the respective caliper parts.

13. The disc brake of claim 6 in which said force supporting abutment is provided with an abutment facing of low friction material.

14. The disc brake of claim 3 wherein the disc and the caliper are axially fixed relative to one another, and wherein said friction elements are opposed to one another and on the opposite sides of the disc and movable towards one another by associated brake operating mechanisms.

15. The disc brake of claim 1 comprising a non-rotatable caliper straddling a portion of said disc, said caliper having portions on opposite sides of said disc and having a space in each portion opening radially outwardly, each said portion having in said space a surface extending obliquely to the opposed surface of said disc in complementary position to the corresponding surface of the opposite portion, one of said friction elements being located in each of said portions and having a surface in sliding abutment with said oblique surface in each of said spaces, said force applying means comprising a cylinder and piston in each of said portions, and a removable element extending transversely of said disc beyond the periphery of said disc from one portion of said caliper to the opposite portion of said caliper and removably secured in said portion to restrain said friction elements from radially outward movement.

16. The disc brake comprising a rotatable disc, a non-rotatable caliper straddling a portion of said disc, said caliper having portions on opposite sides of said disc and having a space in each portion opening radially outwardly, each said portion having in said space a surface extending obliquely to the opposed surface of said disc in complementary position to the corresponding surface of the opposite portion, a friction element in each of said portions having a surface in sliding abutment with said oblique surface in each of said spaces, a cylinder and piston in each of said portions having an axis of movement of said piston inclined at an angle to a perpendicular to said disc and having a connection to said friction element permitting movement of said friction element relative to said piston transversely of the direction of movement of said piston, the tangent of said angle being at least equal to the coefficient of friction between said friction element and said disc and a removable element extending transversely of said disc beyond the periphery of said disc from one portion of said caliper to the opposite portion of said caliper and removably secured in said portion to restrain said friction elements from radially outward movement.

17. A disc brake comprising a rotatable disc, a brake housing adjacent a portion of said disc, at least one friction element supported in said housing to move to and from contact with a surface of said disc and means acting at an oblique angle to the braking surface of the disc to move said friction element into frictional engagement with said disc, said housing having a force-supporting and guide surface positioned to guide said friction element in its movement to and from engagement with said disc and to support said friction element against rotation in one direction only about the axis of said disc, said force-supporting and guide surface being fixed relative to the housing and disposed parallel to the line of action of the means to move the friction element, and said brake being free from guide or force receiving surfaces other than said means to move said friction element for supporting said friction element against rotation in the opposite direction, said friction element having a surface in sliding engagement with said force supporting and guide surface, and said means to move said friction element into contact with said discs has a sliding connection to said friction element to permit relative movement transverse to the direction of action of said means for moving said friction element.

References Cited by the Examiner
UNITED STATES PATENTS

| | | | |
|---|---|---|---|
| 2,934,174 | 4/1960 | Lucien | 188—73 |
| 2,957,553 | 10/1960 | Chouings et al. | 188—73 |

FOREIGN PATENTS

| | | |
|---|---|---|
| 828,961 | 2/1960 | Great Britain. |
| 1,019,873 | 11/1957 | Germany. |
| 1,239,953 | 7/1960 | France. |
| 1,277,054 | 10/1961 | France. |

MILTON BUCHLER, *Primary Examiner.*

EUGENE BOTZ, ARTHUR L. LA POINT, *Examiners.*